No. 775,042.　　　　　　　　　　　　PATENTED NOV. 15, 1904.
R. E. LEE.
RAILWAY TICKET.
APPLICATION FILED FEB. 9, 1903.
NO MODEL.

No. 775,042. Patented November 15, 1904.

UNITED STATES PATENT OFFICE.

ROBERT E. LEE, OF PALESTINE, TEXAS.

RAILWAY-TICKET.

SPECIFICATION forming part of Letters Patent No. 775,042, dated November 15, 1904.

Application filed February 9, 1903. Serial No. 142,625. (No model.)

*To all whom it may concern:*

Be it known that I, ROBERT E. LEE, a citizen of the United States, residing in Palestine, in the county of Anderson and State of Texas, have invented certain new and useful Improvements in Railway-Tickets, of which the following is a full, clear, and exact description, reference being had to the accompanying drawings, forming part of this specification.

The object of my invention is to produce a railway or other transportation ticket wherein the liability of said ticket being illegitimately used or negotiated is reduced to a minimum.

The invention consists in features of novelty hereinafter fully described, and pointed out in the claims.

Figure I is a view of the face or front of the ticket, said view being shown in two sections. Fig. II is a view of the back or reverse side of the ticket, portions of the ticket in this view being broken away.

My improved ticket consists of an elongated strip of paper or cardboard having the proper reading matter and marks printed or otherwise placed upon its front and rear faces.

A short distance from the edge of the top of the ticket is a transverse row of perforations 1, and upon the section 2 above this row of perforations is printed or otherwise stamped the name of the destination-point for which the ticket is made out. A suitable distance below the row of perforations 1 is a second transverse row of perforations 3, and at the top of the section 4, between the rows of perforations 1 and 3, appear the words "Original contract" and the name of the railway or transportation line issuing the ticket. Immediately below this name and in the center of the space 4 is printed the "contract" 5 between the railway issuing the ticket and the purchaser, and immediately beneath this contract are spaces 6 and 7 for the signatures of the purchaser and the railway agent issuing said ticket, also spaces 8 and 9 for the date of the sale of the ticket and the date of the limit of said ticket. Below the contract 5 and to one side of the spaces 6 and 7 appear the words "Description of passenger," and adjacent thereto are suitable marks or spaces 10, which are to be punched out or otherwise marked by the selling agent so as to correspond with the personal appearance of the purchaser of the ticket to identify him. Some distance below the line of perforations 3 is a transverse row of perforations 11, and upon the center of the space 12 between the rows of perforations 3 and 11 is printed the "duplicate contract" 13, which is, as the title indicates, a duplicate of the contract 5, with the omission of the signatures of the purchaser and railway agent. Upon the left-hand side of the space 12 is a series of spaces 14, at the top of which series appear the words "Going limit," and which spaces are to be punched or otherwise suitably marked to specify the limit of time in which the ticket is to be used for passage to the destination. On the right-hand side of the space 12 is a series of spaces 15, at the head of which appear the words "Final limit," these spaces being punched out or otherwise suitably marked to indicate the limit of time in which the ticket may be used on the return trip or from the destination to the point where the ticket was originally sold. A short distance below the row of perforations 11 is a transverse row of perforations 16, and the section 17, between the rows of perforations 11 and 16, is suitably printed and is to be torn off by the conductor of the first division on the return trip, and there may be as many of these sections 17 as there are divisions on the return trip. The row of perforations 18 a short distance from the row 16 forms a section 19, on which is printed certain instructions to the purchaser of the ticket. A row of perforations 20 a short distance from the row 18 forms a section 21, on the left-hand portion of which appear the words "Description of passenger," with a series of marks or spaces 22, corresponding to the spaces 10, previously described, and which are to be punched or otherwise marked to correspond with the appearance of the purchaser of the ticket. The right-hand portion of the space 21 contains an acknowledgment of the correctness of the description of a passenger, together with spaces for the signatures of the purchaser and the selling agent and the date the ticket was sold.

The balance of the ticket below the row of perforations 20 consists of a plurality of ticket-sections 23, separated by lines of perforations 24, there being as many of these sections 23 as there are divisions from the point where the ticket was sold to the destination.

Upon the rear or reverse side of the ticket, immediately above the row of perforations 11, is a space 25, in which is printed certain instructions headed "Notice to conductors." Immediately above these instructions and on the right-hand side of the ticket are the words "Description of passenger," with a series of spaces 26, corresponding to the spaces 10 and 22, previously mentioned. Immediately above these spaces 26 is a rectangular space 27, which is to receive the stamp of the agent at the destination. Above this space 27 is a space 28, containing instructions to the purchaser of the ticket, immediately below which are spaces 29 and 30, which are for the signatures of the purchaser and destination agent. To the left of the spaces just described is a series of marks or spaces 31, headed by the words "Date of identification," which spaces are to be punched out or otherwise marked with the date on which the purchaser of the ticket is identified by the agent at the destination. Immediately above the space 28 is a space 32, which is for the purpose of receiving the stamp of the agent issuing and selling the ticket.

All of the reading matter, marks, and spaces upon the rear side of the ticket occupy the space corresponding to the space occupied by the duplicate contract on the front or face of the ticket.

When a ticket of my improved form is sold, the agent making the sale detaches the section 2 at the row of perforations 1 and files the same in his office. The spaces 10 and 22 are now punched out or otherwise marked to correspond with the appearance of the purchaser of the ticket, after which the purchaser and selling agent sign the ticket in the proper spaces 6 7 and upon the section 21, and the date of the sale is indicated in the space 8, while the limit of time in which said ticket is to be used is indicated in the space 9. The going limit and final limit for the use of the ticket are punched out or otherwise marked in the spaces 14 and 15, and the issuing agent's stamp is placed in the space 32 on the reverse side of the ticket. The upper section 4 of the ticket is now detached from the portion 12 at the row of perforations 3, and said section 4 is forwarded to the proper agent at the destination-point. The balance of the ticket is delivered to the purchaser, and when said ticket is presented on the going trip the various conductors or ticket-takers remove the proper sections 23 after noting that the description of the passenger, as indicated in the spaces 22, corresponds with the person presenting the ticket. The section of the ticket between the rows of perforations 18 and 20 is removed by the last conductor on the going trip. During the period of time that the purchaser of the ticket is at the destination said purchaser retains the portions 12, 17, and 19 of the ticket. Before the ticket can be made use of for the return trip the purchaser takes the ticket to the destination agent who has previously received the section 4 of the ticket from the selling agent, which section contains the original contract and the description of the purchaser of the ticket, and the destination agent punches out or otherwise marks the proper spaces 26 to correspond with the person presenting the ticket and with the description of the passenger, as indicated in the spaces 10. The date that this identification is made is also punched or indicated in the proper spaces in the series of spaces 21, and the holder of the ticket and the agent sign said ticket in the spaces 29 and 30. The destination agent stamps the ticket in the space 27, after which said ticket is delivered to the purchaser to be used in the return trip. The various conductors on the return trip remove the various sections 17, (the section 19 being removed with the first or lowest one of the section 17,) the final conductor taking up the section 12, containing the duplicate contract. Thus it will be seen that by the use of a ticket of my improved form the liability of its being illegitimately used is reduced to a minimum, inasmuch as the party presenting the ticket to the conductors both going and coming and the destination agent must correspond with the description of the buyer of the ticket, as indicated by the selling agent.

With my improved ticket the purchaser is never required to part with any portion of his purchase—that is, he retains both the going and the return part of the ticket—while at the same time the destination agent is provided with means for identifying the original purchaser, so that no person other than the original purchaser can have the return portion of the ticket stamped or validated by the destination agent.

I claim as my invention—

1. A railway-ticket comprising going-coupons and the following portions arranged end to end and in the following order: first a contract-coupon containing appropriately-designated spaces for the signature of the passenger, for the signature of the selling agent, for the destination of the passenger and for the time limit; second, a contract portion containing on one side a duplicate contract and an appropriately-designated final-limit space to be punched to denote the final limit, and on the other side an appropriately-designated space for the date of identification, to be punched to denote the date of identification, and appropriately-designated spaces for the signature of the passenger, for the signature of an agent, and for the stamp of the destination agent; and third, the return-coupons.

2. A railway-ticket having a coupon-contract portion containing an appropriately-designated space for a description of the passenger; a duplicate-contract portion containing an appropriately-designated space for a description of the passenger; and "going" and the "return" coupons attached to the duplicate-contract portion, said duplicate-contract portion containing an appropriately-designated space for marks of the destination agent to identify the description filled in by him on the duplicate-contract portion, substantially as set forth.

ROBERT E. LEE.

In presence of—
 AL. F. MUSICK,
 F. D. DAGGETT.